Patented Nov. 11, 1947

2,430,484

UNITED STATES PATENT OFFICE 2,430,484

AZO DYES FROM 3-CARBALKOXY-PYRAZOLONES

William H. Strain and Joseph B. Dickey, Rochester, N. Y., assignors to Eastman Kodak Company, Rochester, N. Y., a corporation of New Jersey No Drawing. Application March 4, 1944, Serial No. 525,102

5 Claims. (Cl. 260—163)

This invention relates to azo dyes from 3-carbalkoxy pyrazolones.

A number of acid dyes which are monoazo compounds containing a pyrazolone nucleus have been known for many years and have been used to dye wool or to prepare color lakes. It has also been proposed to dye cellulose ester rayon with non-sulfonated monoazo compounds containing a pyrazolone nucleus of the following formula:

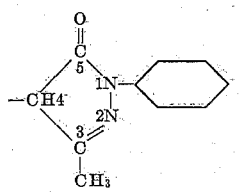

Such monoazo compounds, however, dye cellulose ester rayon only at low rates of speed at the ordinary dyeing temperatures. Subsequently, it was proposed to dye cellulose ester rayon with monoazo dyes containing a pyrazolone nucleus of the following formula:

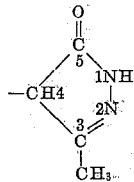

However, such pyrazolone dyes have low tinctorial power, but are useful for tinting cellulose ester rayon. Disazo compounds containing a pyrazolone nucleus of the following formula:

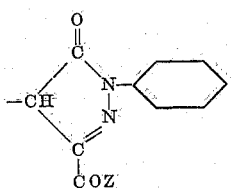

wherein Z represents hydroxyl, amino or alkoxyl, have been developed on cellulose ester rayon by applying an aminoazo compound to the rayon, diazotizing and coupling on the rayon with a pyrazolone corresponding to the nucleus formulated immediately above. Monoazo compounds containing a pyrazolone nucleus of the following formula:

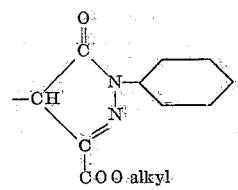

have been found to be very stable to light and to be suitable for the coloring of cellulose ester lacquers. Such monoazo compounds, however, dye cellulose ester rayon only at low rates of speed at the ordinary dyeing temperatures and are, therefore, impractical as cellulose ester rayon dyes.

We have now found a kind of non-acid monoazo compound which has not only very good fastness to light, but also can be employed to dye cellulose ester rayon and fabrics made therefrom, since the compounds color cellulose ester rayon at a practical rate of speed at low temperatures (60 to 65° C.) and have a high tinctorial power for the rayon. Moreover, our new dyes have exceptional light-fastness on cellulose ester rayon.

It is, accordingly, an object of our invention to provide new monoazo dyes and to provide a process for preparing the same. Another object is to provide cellulose ester rayon colored with such compounds. Other objects will become apparent hereinafter.

The compounds of the invention can be represented by the following general formula:

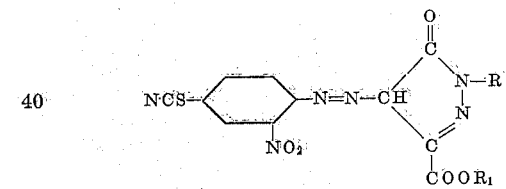

wherein R represents a member selected from the group consisting of hydrogen and aliphatic alcohol radicals, and $R_1$ represents an aliphatic alcohol radical.

To prepare one of the new compounds, we diazotize 2-nitro-4-thiocyanoaniline and couple the resulting diazonium salt with an appropriate 3-carbalkoxy pyrazolone. The 3-carbalkoxy pyrazolones which we employ have the following general formula:

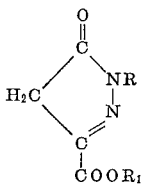

wherein R and R₁ have the values set forth above.

The following examples will serve to illustrate our new monoazo dyes and the manner of obtaining the same.

*Example 1.—4-(2-nitro-4-thiocyanophenylazo)-3-carbethoxy-5-pyrazolone*

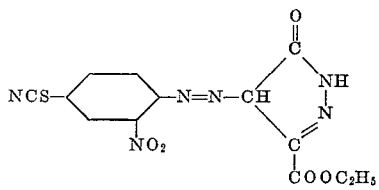

195 g. (1 mole) of finely ground 2-nitro-4-thiocyanoaniline, 340 cc. of concentrated hydrochloric acid, and 600 cc. of water were stirred in the presence of a wetting agent, such as a sodium alkylnaphthalene sulfonate. Then 1500 g. of crushed ice were added. The mixture was diazotized by adding 73 g. of sodium nitrite dissolved in water, at a temperature of about 0° C. When diazotization was complete the solution was filtered. The resulting solution was added to a well iced mixture of 150 g. (1 mole) of 3-carbethoxy-5-pyrazolone, 1500 cc. of water and 924 g. of sodium bicarbonate. If desired, an additional amount of sodium bicarbonate can be added. When coupling was complete the yellow azo dye was filtered off, washed with water and dried in the air. The dye colored cellulose acetate rayon yarn a greenish-yellow shade with an orange tint very fast to light.

Using 3-carbomethoxy-5-pyrazolone instead of 3-carbethoxy-5-pyrazolone, a yellow dye was obtained which colored cellulose acetate rayon yarn a greenish-yellow shade very fast to light. In a similar manner, any of the pyrazolones containing an alcohol esterified carboxyl group (formulated above) can be employed to give yellow dyes.

The pyrazolone compounds containing an esterified carboxyl group in the 3-position can be prepared by esterifying a 3-carboxy-5-pyrazolone with an alcohol in the presence of a mineral acid such as hydrogen chloride, in accordance with the method of Rothenburg, Berichte 26, 2053 (1893). Alcohols such as methanol, ethanol, n-propanol, isopropanol, n-butanol, ethylene glycol, diethylene glycol, triethylene glycol, propylene glycol, β-methoxyethanol and diethylene glycol monoethyl ether can be employed, for example. The 3-carboxy-5-pyrazolones are formed by hydrolyzing the corresponding 3-carbethoxy-5-pyrazolones which, in turn, are formed by the interaction of oxalacetic ester with hydrazine or hydrazines in which one of the hydrogens is replaced by an alcohol radical. See Rothenburg, Berichte 25, 3441 (1892) and Berichte 26, 1719 (1893).

The new azo compounds of our invention are of greatest utility for the coloration of textile materials comprising organic derivatives of cellulose. However, they may be used for the coloration of non-vegetable textile fibers, in general. Thus, they can be used to color organic derivatives of cellulose, silk, wool, nylon, vinyl acetate-vinyl chloride copolymers, and protein synthetic wools, also cellulose ester and cellulose ester lacquers, as well as lacquers from vinyl compounds can be colored. The coloration produced by our new azo compounds is generally greenish yellow.

Typical organic derivatives of cellulose that can be colored with our new azo compounds include the hydrolyzed, as well as the unhydrolyzed, cellulose carboxylic esters, such as cellulose acetate, cellulose propionate and cellulose butyrate, and the hydrolyzed, as well as the unhydrolyzed, mixed cellulose carboxylic esters, such as cellulose acetate propionate and cellulose acetate butyrate, and the cellulose ethers, such as methyl cellulose, ethyl cellulose and benzyl cellulose.

The azo compounds of our invention are for the most part relatively insoluble in water and, accordingly, they may be advantageously directly applied to the textile material undergoing coloration in the form of an aqueous suspension which can be prepared by grinding the dye to a paste, in the presence of a sulfonated oil soap, or other suitable dispersing agent and dispersing the resulting paste in water. In some instances the compounds may possess sufficient solubility in water to render the use of a dispersing agent unnecessary. Generally speaking, however, the use of a dispersing agent is desirable.

Direct dyeing operations can, with advantage, be conducted at temperatures of about 75° to 85° C., but any suitable temperature may be used. Thus the textile material to be dyed or colored is ordinarily added to the dyebath at a temperature lower than that at which the main portion of the dyeing is to be effected, e. g., a temperature of from 45° to 55° C. Following this the temperature is raised to that selected for carrying out the operation. The temperature at which the process is continued may vary somewhat, depending upon the particular material undergoing coloration. As understood by those skilled in the art, the intensity of dyeing can be varied by varying the proportion of dye to the material undergoing preparation. Generally speaking, 1 to 3 per cent by weight of the dye to material is employed, although any desired proportions can be used.

Suitable dispersing agents are disclosed in U. S. Patent 2,115,030, issuing April 26, 1938. The process disclosed in the aforesaid patent for the dyeing of cellulose acetate can be used in applying the dyes in the present invention to cellulose acetate. While a satisfactory method for dyeing has been disclosed herein, it will be understood that any other suitable methods for dyeing the non-vegetable textile material named herein can be employed. Lacquers may be colored with the dye compounds of our invention by the methods customarily employed in the lacquer art.

The term nylon is intended to describe a linear polyamide resin such as set forth in United States Patent 2,071,250, dated February 16, 1937. The term aliphatic alcohol radical is intended to mean any radical derivable from an aliphatic alcohol by dropping the OH group, e. g., ethyl from ethyl alcohol, allyl from allyl alcohol, tertiary butyl from tertiary butyl alcohol, etc.

What we claim as our invention and desire to be secured by Letters Patent of the United States is:

1. The azo compounds of the following general formula:

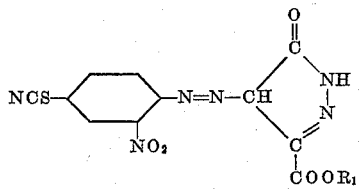

wherein $R_1$ represents a low carbon aliphatic radical.

2. The azo compounds of the following general formula:

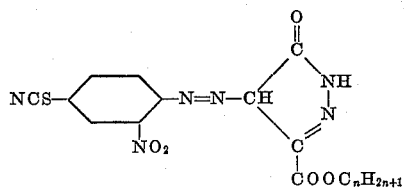

wherein $n$ represents a small whole positive integer.

3. The azo compound of the following formula:

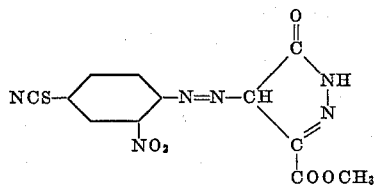

4. The azo compound of the following formula:

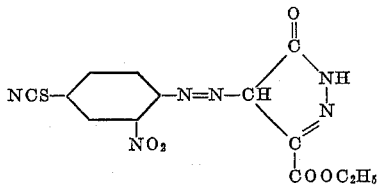

5. A process for preparing an azo dye comprising coupling diazotized 2-nitro-4-thiocyanoaniline with a pyrazolone of the following general formula:

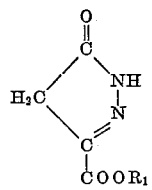

wherein $R_1$ represents a low carbon aliphatic radical.

WILLIAM H. STRAIN.
JOSEPH B. DICKEY.

REFERENCES CITED

The following references are of record in the file of this patent:

UNITED STATES PATENTS

| Number | Name | Date |
|---|---|---|
| 1,791,432 | Schmid et al. | Feb. 3, 1931 |
| 2,126,468 | Holzach | Aug. 9, 1938 |

FOREIGN PATENTS

| Number | Country | Date |
|---|---|---|
| 7,363 | Great Britain | 1904 |